Sept. 15, 1925.                      1,553,570
C. G. STRANDLUND
HITCH DEVICE
Filed Dec. 13, 1922

Patented Sept. 15, 1925.

1,553,570

UNITED STATES PATENT OFFICE.

CARL G. STRANDLUND, OF MOLINE, ILLINOIS, ASSIGNOR TO DEERE & COMPANY, OF MOLINE, ILLINOIS, A CORPORATION OF ILLINOIS.

HITCH DEVICE.

Application filed December 13, 1922. Serial No. 606,693.

*To all whom it may concern:*

Be it known that I, CARL G. STRANDLUND, a citizen of the United States, residing at Moline, in the county of Rock Island and State of Illinois, have invented certain new and useful Improvements in Hitch Devices, of which the following is a specification, reference being had therein to the accompanying drawing.

My invention relates to that class of hitch devices employed to connect a tractor with an agricultural implement to be drawn thereby, and has for its object to provide a hitch by which the implement is offset from the longitudinal central line of the tractor and operates automatically to shift the offset position from one side of side lines to the other when the tractor turns to change the direction in which it is desired the implement shall operate.

Referring to the drawings in which similar numerals indicate identical parts,—

Figure 1 illustrates my device connecting a lister plow with a tractor, with the plow offset to the right. Figure 2 is similar to Figure 1 but showing the tractor and plow operating in an opposite direction with the plow offset to the left of the tractor. Figure 3 is an enlarged view of the hitch device and its connection to the tractor and plow and showing the position of the parts when the tractor is turning and the connection with the plow is about to shift to the left in the direction of the turn. Figure 4 is an end view of the hitch device in part section. Figure 5 is a detail section on the line 5—5 of Figure 3, and Figure 6 is a detail section on the line 6—6 of Figure 3.

The tractor 1, represented in dotted lines, has rigidly mounted, on the rear center of its structure, a support 2 with a laterally disposed horizontal flange 3 having its rear edge curved. Pivotally mounted, centrally of its length, on the support 2 is a transversely disposed member *a* formed of two flat parallel bars 3 and 4 spaced apart and secured together by bolts 5 and 6, and the bolt 7 which constitutes the pivot on which the member rocks. Parallel with the bars 3 and 4, and spaced apart therefrom to provide a runway 8, is a bar 9 having its ends bent toward the bars 3 and 4 and secured respectively between the ends of the bars 3 and 4 by bolts 10 and 11.

Bolted on opposite sides respectively of the beam 12 of a lister plow 13 are forwardly extending straps 14 and 15 and between them is securely bolted a bar 16. The forward end of the bar 16 projects into a slot in a U-shaped shackle 17 and is held therein by a suitable bolt 18. The arms of the U-shaped shackle extend forwardly, and respectively above and below the bar 9, and between their ends within the runway 8, is mounted a roller 19 rotatable on the bar 9.

As shown in Figure 1 the plow is offset to the right and the transversely disposed member *a* is at an acute angle to the line of draft, which it assumes by the pull of the plow and which it maintains by reason of the bolt 5 contacting with the flange 3. In making a turn to the left, however, as at the end of a furrow, the member *a* retains its relative position, as shown in Figure 1, until the continued turning of the tractor changes the angle of the member *a* to the left sufficient to cause the forward end of the plow to swing to the left, the pull of the plow compelling the roller 19 to rotate along the bar 9 until it is in contact with the opposite end thereof, and when the turn of the tractor is completed the plow is offset to the left and the parts are as shown in Figure 2, the bolt 6 then is in contact with the flange 3. I regulate the degree of offset in either direction by inserting bolts or pins in holes 20 in the bar 9 so that the shackle 17 will contact with and will bear against the bolt on the side of the offset instead of the roller 19 bearing against the adjacent bent end of the bar 9.

It is obvious that the action of the parts in a turn from left to right will be the reverse of that described.

What I claim is—

1. The combination with a tractor and a movable body, of means attaching said body to the tractor to operative position off-set at one side of the longitudinal central line thereof and automatically operating to transfer said body to operative position off-set at the opposite side of said line by a turn of the tractor in that direction.

2. The combination with a tractor and a movable body, of means attaching said body to the tractor including a horizontally disposed rockable member extending transversely of the rear of the tractor and secured thereon intermediate its length by a vertical pivot, means movably attaching said body to said member to operative position off-set at one side of the longitudinal central line of the tractor and automatically movable on said member to the opposite side of said line when the tractor turns and rocks said member in that direction.

3. The combination with a tractor and a movable body of means attaching said body to the tractor including a rockable member extending transversely of the rear of the tractor and secured thereon intermediate its length by a vertical pivot, means movably attaching said body to said member to operative position off-set at one side of the longitudinal central line of the tractor and automatically movable on said member to operative position off-set at the opposite side of said line when the tractor turns and rocks said member in that direction, and means to limit the rocking movement of said member.

4. The combination with a tractor and a movable body, of means attaching said body to the tractor including a horizontally disposed rockable member extending transversely of the rear of the tractor and secured thereon centrally of its length by a vertical pivot, a runway extending from side to side of said member, means movably attaching said body to said member within the runway to operative position off-set at one side of the longitudinal central line of the tractor and automatically movable along said runway to operative position off-set to the opposite side of said line when the tractor turns and rocks said member in that direction.

5. The combination with a tractor and a movable body, of means attaching said body to operative position off-set to the longitudinal central line of the tractor, the tractor including a horizontally disposed member extending operatively transversely of the rear of the tractor and secured thereon centrally of its length by a vertical pivot and rockable in the direction of a turn of the tractor, a runway extending from side to side of said member, and means movably attaching said body to said member within the runway and in operative position at one end thereof and movable automatically to operative position at the opposite end of the runway when the tractor turns and rocks said member.

6. The combination with a tractor and a movable body, of means attaching said body to operative position off-set to the longitudinal central line of the tractor including a horizontally disposed member extending transversely of the rear of the tractor and secured thereon centrally of its length by a vertical pivot and rockable by a turn of the tractor and in the direction of said turn, a runway extending from side to side of said member, and a shackle connected to said body and member and adapted to move automatically in said runway to operating position off-set to said line in either direction by turn of the tractor.

7. The combination with a tractor and a movable body, of means attaching said body to the tractor in operative position at one side of the longitudinal central line thereof and automatically operating to transfer said body to operative position on the opposite side of said line by a turn of the tractor in that direction, and means to vary the movement of said body in either direction.

CARL G. STRANDLUND.

Certificate of Correction.

It is hereby certified that in Letters Patent No. 1,553,570, granted September 15, 1925, upon the application of Carl G. Strandlund, of Moline, Illinois, for an improvement in "Hitch Devices," errors appear in the printed specification requiring correction as follows: Page 2, line 4, claim 2, after the word "to" insert the words *operative position off-set at;* same page, line 78, claim 7, before the word "movement" insert the word *transverse;* and that the said Letters Patent should be read with these corrections therein that the same may conform to the record of the case in the Patent Office.

Signed and sealed this 13th day of October, A. D. 1925.

[SEAL.] KARL FENNING,
*Acting Commissioner of Patents.*